L. J. TETLOW.
TROLLEY WHEEL.
APPLICATION FILED JUNE 5, 1908.
910,433.
Patented Jan. 19, 1909.
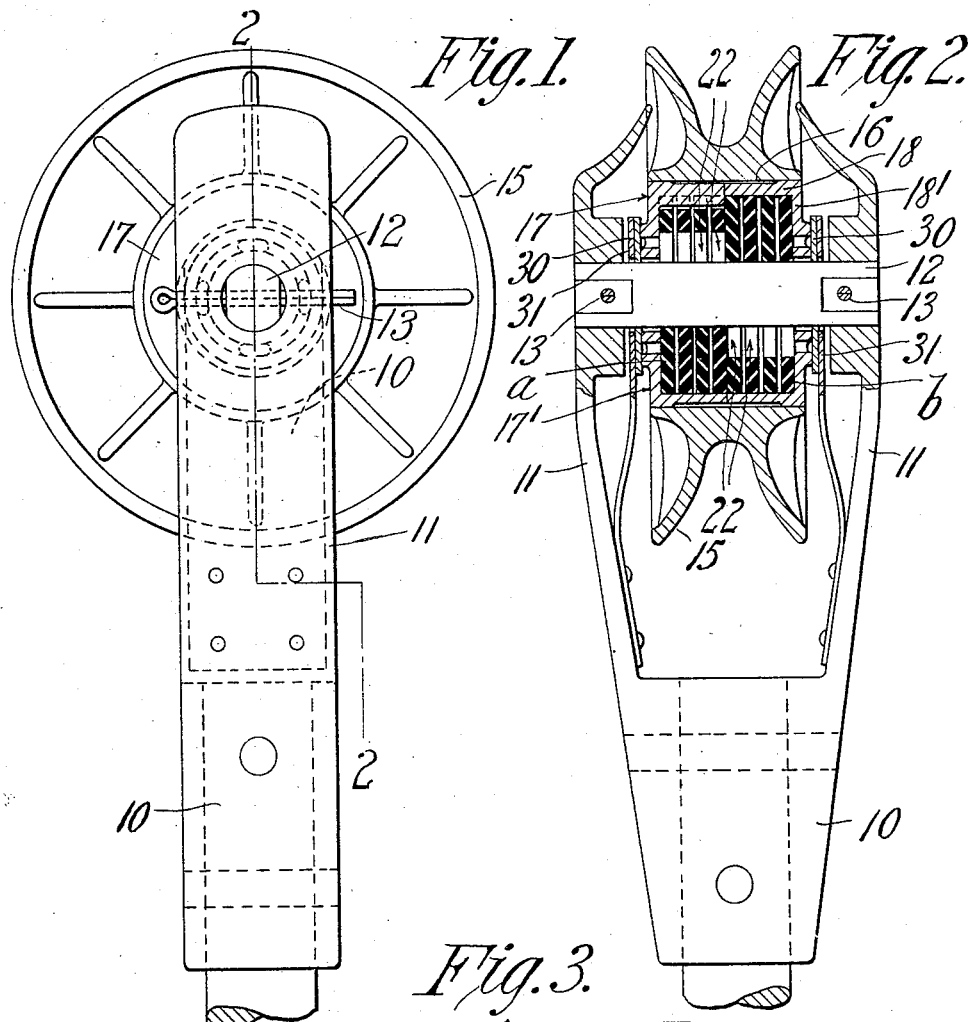
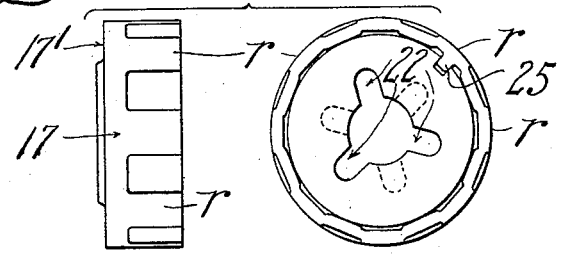
WITNESSES:
H. L. Sprague
R. N. Mowry
INVENTOR,
Lewis J. Tetlow.
BY Wm. F. Bellows
ATTORNEY.

UNITED STATES PATENT OFFICE.

LEWIS J. TETLOW, OF HOLYOKE, MASSACHUSETTS, ASSIGNOR TO NEW ENGLAND TROLLEY WHEEL COMPANY, OF HOLYOKE, MASSACHUSETTS, A CORPORATION OF MASSACHUSETTS.

TROLLEY-WHEEL.

No. 910,433.     Specification of Letters Patent.     Patented Jan. 19, 1909.

Application filed June 5, 1908. Serial No. 436,798.

*To all whom it may concern:*

Be it known that I, LEWIS J. TETLOW, a citizen of the United States of America, and resident of Holyoke, in the county of Hampden and State of Massachusetts, have invented certain new and useful Improvements in Trolley-Wheels, of which the following is a full, clear, and exact description.

This invention relates to trolley wheels and their supports, and especially to that class thereof in which the electric current which is received by the wheel from the wire will be conducted to the motor of an electric car through conductors attached to a contact member carried by the trolley pole or other support, and it has for one of its objects the provision of an improved wheel of this character in which the wear due to the running of the wheel on its support will be minimized.

My invention has, furthermore, for its object the combination with a trolley wheel of a bearing ring disposed within the central portion thereof and made of a wear-resisting insulating material which is in running contact with the wheel axle supported in the harp in such a manner that the axle itself will not constitute one of the current conducting elements of the device.

My invention has, furthermore, for its object the provision of a trolley wheel the hub of which is chambered to receive a series of lubricant-carrying disks which in themselves constitute the bearing surface of the wheel on the axle and which can be removed and renewed at pleasure, thus increasing the length of service of the wheel to a very material extent.

Further objects of the invention will hereinafter appear and the means of their attainment pointed out in the claims.

The invention has been fully illustrated in the accompanying drawings in which similar characters denote similar parts, and in which:—

Figure 1 is a side view of a trolley wheel and its supporting harp; Fig. 2 is a section on line 2—2, Fig. 1; Fig. 3 illustrates in detail one of the sections of which the hub of the wheel is composed. Fig. 4 shows a perspective view of one of the bearing disks disposed within the hub.

Briefly stated, my present invention has for its particular object to provide a wheel which carries its own lubrication in an inclosed chamber, and the body of which is made of a conducting material while the hub portion thereof consists of a wear resisting material of high quality, which is furthermore insulating in its character so that the supporting axle which passes through the bearing will not only last longer than the wheel used heretofore, but, on account of the non-conductivity of the material all sparking between the wheel and its supporting axle together with its inherent crystallization of the metals will be avoided.

Referring to the drawings, 10 denotes the base portion of a harp which is bifurcated at its upper end to form arms 11 in which the axle 12 may be non-rotatable but removably supported, as, for instance, by means of cotter pins 13 as usual.

Mounted for rotation on the axle 12 is the trolley wheel indicated in a general way by 15 and having a central aperture or chamber 16 adapted to receive the central bearing of the wheel which in its preferred form is in turn carried by a two-part shell comprising the sections 17 and 18 respectively. The sections 17 and 18 are provided at their outer ends with heads 17′ and 18′ respectively, which serve as covers for inclosing a chamber formed by the coöperation of the sections 17 and 18, and between which are supported a series of separate disks assembled to form two separate bodies $a$ and $b$, each comprising a number of said disks.

By referring to Fig. 4, it will be seen that each of the disks 20 has a central aperture 21, the diameter of which corresponds to the axle 12 so as to have a free running contact thereon. Each disk 20 has also a series of radially extending recesses 22 which form pockets for containing the lubricant with which the chamber formed by the sections 17 and 18 is filled and in order to insure the lubrication of the axle for the entire length of its running contact with the wheel, and also to insure the maintenance of the lubricant toward both ends from the central line of the axle are preferably disposed the disk bodies $a$ and $b$ so that the pockets 22 of one set will be offset or staggered relatively to those of the other set, as clearly indicated in Figs. 2 and 3.

The chamber sections 17 and 18 are substantially similar and are forced into the hub of a wheel 15 under pressure so as to form a strong union and rotate therewith, each section being provided at its periphery with projecting portions r, which latter will flatten to some extent, as each section is forced into place within the wheel hub.

Means are provided for retaining the wheel bearing sections a and b in position and for co-rotation within the shell sections 17 and 18, these means consisting substantially of a rib 25 carried by each of said sections adapted to engage notches 26 provided therefor in each of the diks 20, it being understood, however, that the size of said disks is such as to fit closely within the inner surface of the respective shell section while the rib 25 constitutes an additional safeguard for positively locking said disks in the shell so that all running wear between the wheel 15 and the axle 12 will, of necessity, fall upon the line of contact between the disks and the axle instead of between the disks and the hub shell.

From the foregoing it will be understood that as a matter of fact the metallic wheel body will be entirely insulated from the axle 12 and consequently all sparking due to imperfect running contact between the wheel and the axle will be entirely obviated. Likewise, it will be seen that if for some reason or other the bearing bodies of the wheel should unduly wear, the latter may readily be removed from the wheel and others substituted therefor, thus saving the waste of what may be otherwise a good wheel.

The current is taken from the trolley wheel body by a pair of washers 30 which contact with the sides of the chamber sections 17 and 18, and which are in turn engaged by contact members 31 shown herein as resilient arms secured to the harp arms 11, as clearly indicated in Fig. 2.

If desired, the several bearing disks of the sections a and b may be closely assembled instead of slightly spaced apart as shown, and on the other hand devices may be employed for spacing each adjacent pair of disks, in which instance the space for receiving the lubricant within the chamber will be correspondingly increased.

Many changes may be made in the particular construction of the device herein shown especially as far as the organization of the hub sections is concerned, without departing from the spirit of the invention.

I claim:—

1. In a trolley wheel, the combination with a metallic wheel body having a chambered hub, a hollow shell held within said hub and rotatable therewith, of a series of separate disks made of wear-resisting insulating material disposed within said shell, and means for locking said disks to said shell.

2. In a trolley wheel, the combination with the metallic wheel body having a chambered hub, a two-part shell, each having a head and disposed within said hub, and frictionally held within the wheel hub, of a series of separate disks made of wear-resisting insulating material disposed between the heads of said shell part and inclosed thereby, and means for locking said disks in said shell.

3. In a trolley wheel, the combination with a metallic wheel body having a chambered hub, and a pair of cup-shaped shell sections having peripheral projections for engaging and rigidly holding said hub and sections together, of a bearing ring made of wear-resisting insulating material inclosed within and by said shell sections, and means for locking said bearing ring therein.

4. In a trolley wheel, the combination with a metallic wheel body having a chambered hub, a pair of independent cup-shaped shell sections, each having an inwardly projecting rib, of a series of separate centrally apertured disks made of wear-resisting insulating material, each having a peripheral notch adapted to be engaged by said ribs respectively and inclosed within said shell sections, the disks in each shell section having radially disposed recesses in communication with said apertures, said shell sections being frictionally held within said chambered hub.

Signed by me at Springfield, Mass., in presence of two subscribing witnesses.

LEWIS J. TETLOW.

Witnesses:
G. R. DRISCOLL,
CHAS. F. SCHMETZ.